US011955683B2

(12) United States Patent
Billod et al.

(10) Patent No.: US 11,955,683 B2
(45) Date of Patent: Apr. 9, 2024

(54) PASSIVE RADIO FREQUENCY DEVICE WITH AXIAL FIXING APERTURES

(71) Applicant: SWISSto12 SA, Renens (CH)

(72) Inventors: Mathieu Billod, Présilly (FR); Arnaud Boland, Chavanne-des-Bois (CH); Santiago Capdevila Cascante, Renens (CH); Emile de Rijk, Grand-Saconnex (CH); Tomislav Debogovic, Chexbres (CH); Alexandre Dimitriades, Nyon (CH); Esteban Menargues Gomez, Préverenges (CH); Lionel Simon, Lausanne (CH)

(73) Assignee: SWISSto12 SA, Renens (CH)

( * ) Notice: Subject to any disclaimer, the term of this patent is extended or adjusted under 35 U.S.C. 154(b) by 372 days.

(21) Appl. No.: 17/601,781

(22) PCT Filed: Apr. 9, 2020

(86) PCT No.: PCT/IB2020/053393
§ 371 (c)(1),
(2) Date: Oct. 6, 2021

(87) PCT Pub. No.: WO2020/208569
PCT Pub. Date: Oct. 15, 2020

(65) Prior Publication Data
US 2022/0216579 A1 Jul. 7, 2022

(30) Foreign Application Priority Data
Apr. 9, 2019 (FR) ...................................... 1903808

(51) Int. Cl.

| | |
|---|---|
| ***H01P 1/04*** | (2006.01) |
| ***H01P 3/12*** | (2006.01) |
| *H01P 11/00* | (2006.01) |

(52) U.S. Cl.
CPC ................ *H01P 3/12* (2013.01); *H01P 1/042* (2013.01); *H01P 11/002* (2013.01)

(58) Field of Classification Search
CPC .. H01P 1/042; H01P 1/04; H01P 1/207; H01P 1/209; H01P 1/00; H01P 3/00;
(Continued)

(56) References Cited

U.S. PATENT DOCUMENTS

| | | | | |
|---|---|---|---|---|
| 2012/0084968 | A1 | 4/2012 | Nath et al. | |
| 2017/0271738 | A1 | 9/2017 | Smith, Jr. et al. | |
| 2023/0043572 | A1 * | 2/2023 | Fujisaki | H01P 1/042 |

FOREIGN PATENT DOCUMENTS

| | | | |
|---|---|---|---|
| WO | 2014174494 | A2 | 10/2014 |
| WO | 2017192071 | A1 | 11/2017 |
| WO | 2018029455 | A1 | 2/2018 |

OTHER PUBLICATIONS

International Search Report for PCT/IB2020/053393 dated Jul. 13, 2020.

(Continued)

*Primary Examiner* — Stephen E. Jones
(74) *Attorney, Agent, or Firm* — Pearne & Gordon LLP

(57) ABSTRACT

Radio frequency device including at least: a tube through which a channel passes, a front face and/or a rear face forming a bearing surface through which the channel passes, the bearing surface forming an annular frame around one end of the tube and being integral with the tube. The bearing surface includes axial fixing apertures passing through the bearing surface and opening outside the channel in order to allow fixation of the device, and the width of the frame being greater at and in the immediate vicinity of the axial fixing apertures than at a distance from these axial fixing apertures.

8 Claims, 3 Drawing Sheets

(58) Field of Classification Search
CPC .. H01P 3/12; H01P 3/122; H01P 3/127; H01P 3/13; H01P 3/14; H01P 11/002
See application file for complete search history.

(56) References Cited

OTHER PUBLICATIONS

Written Opinion for PCT/IB2020/053393 dated Jul. 13, 2020.
Rahiminejad S et al.: “Micromachined Contactless pin-flange adapter for robust high-frequency measurements”, Journal of Micromechanics & Microengineering, Institute of Physics Publishing, Jul. 22, 2014, p. 84004, vol. 24, No. 8, Bristol, GB, XP020268128.
Li, Huilin: “Waveguide Flange Design and Characterization of Misalignment at Submillimeter Wavelengths”, May 2013.
D’Auria, Mario, et al.: “3-D Printed Metal-Pipe Rectangular Waveguides”, IEEE Transactions on Components, Packaging and Manufacturing Technology, Sep. 2015, pp. 1339-1349, vol. 5, No. 9.

* cited by examiner

PASSIVE RADIO FREQUENCY DEVICE WITH AXIAL FIXING APERTURES

TECHNICAL FIELD

The present invention relates to a radio frequency device comprising axial fixing apertures.

STATE OF THE ART

Passive radio frequency devices are used to propagate or manipulate radio frequency signals without using active electronic components. Passive RF devices include for example passive waveguides based on guiding waves within hollow metal channels, filters, antennas, mode converters, etc. Such devices can be used for signal routing, frequency filtering, signal separation or recombination, transmission or reception of signals into or from free space, etc.

Conventional waveguides used for radio frequency signals have internal apertures of, for example, rectangular or circular cross-section. They allow the propagation of electromagnetic modes corresponding to different electromagnetic field distributions along their cross-section.

Radio frequency devices are used, for example, in aerospace (aircraft, helicopters, drones), to equip a spacecraft in space, on a ship at sea or on a submarine, on devices operating in the desert or in high mountains, in each case in hostile or even extreme conditions. In these environments, radio frequency devices are exposed to:

- extreme pressures and temperatures that vary significantly, leading to repeated thermal shocks;
- mechanical stress, as the waveguide is integrated into a machine that is subjected to shocks, vibrations and loads that impact the waveguide;
- hostile weather and environmental conditions in which waveguide-equipped vehicles operate (wind, frost, humidity, sand, salt, fungi/bacteria).

In addition, weight-related requirements are often critical for space or aeronautical applications.

In order to meet these constraints, waveguides formed by assembling previously machined metal plates are known, which make it possible to manufacture waveguides suitable for use in hostile environments. However, the manufacture of these waveguides is often difficult, costly and not easily adaptable to the manufacture of light and complex shaped waveguides.

Waveguides manufactured in this way by assembling plates of aluminium, copper, titanium, etc., with or without surface treatments, are therefore often made as standardised parts which must then be assembled together. On the other hand, it is often useful to be able to connect together two or more passive radio frequency devices, for example a waveguide with an antenna or several waveguide portions, in order to create various types of configurations. These connections are most often made by means of flanges or clamps in order to achieve the desired system. The presence of these connection elements increases the weight of the system, which is particularly problematic for applications in aeronautics or space.

For example, WO2018029455 describes a waveguide connector comprising a flange and a plurality of ports. The flange includes means for coupling to another waveguide connector, each port of the plurality of ports being configured to interface with a respective waveguide. The volume of the flange and its weight are substantial relative to the connector.

As an example, the dissertation by Huilin L I, "Waveguide flange design and characterization of misalignment at submillimeter wavelengths", May 2013, pages 4, 22, 23, 24, 26, 62, 152, describes various embodiments of waveguide connectors, e.g. flanges with complementary holes and pins, flanges with complementary male/female profiles, or flanges with an interlocking alignment ring.

Examples of such flanges are shown in FIGS. 1*a*, 1*b* and 1*c* herein. It can be seen that known interfaces use flanges of large dimensions and masses compared to the useful part of the waveguides. In order to make connections with great rigour, with rigorous alignments and durable fixings, the flanges occupy particularly large surfaces.

WO2017/192071 discloses a waveguide interconnect system that provides fast and reliable interconnection with minimal interconnections. The interconnect system comprises a flange adapter element adapted to be disposed between two flanges of two waveguides. The connection of the two waveguides therefore requires an additional part to connect the waveguides which increases the complexity and cost of waveguide assembly.

Recent work has demonstrated the possibility of realizing passive radio frequency devices, including antennas, waveguides, filters, converters, etc., using additive manufacturing methods, for example 3D printing. In particular, the additive manufacturing of waveguides comprising both a core of non-conductive material, such as polymers or ceramics, and a shell of conductive metal is known.

In particular, waveguides comprising ceramic or polymer walls manufactured by an additive method and then covered with a metal plating have been suggested. The internal surfaces of the waveguide must indeed be electrically conductive to operate. The use of a non-conductive core allows on the one hand to reduce the weight and the cost of the device, and on the other hand to implement 3D printing methods adapted to polymers or ceramics and allowing to produce high precision parts with low roughness.

As an example, the article by Mario D'Auria et al, "3-D PRINTED METAL-PIPE RECTANGULAR WAVEGUIDES", 21 Aug. 2015, IEEE Transactions on components, packaging and manufacturing technologies, Vol. 5, No. 9, pages 1339-1349, describes in paragraph III a process for manufacturing the core of a waveguide by fused deposition modeling (FDM).

For example, waveguides made by additive manufacturing are known, comprising a non-conductive core manufactured for example by stereolithography, by selective laser melting, by selective laser sintering, or by another additive process. This core typically has an internal opening for the propagation of the radio frequency signal. The internal walls of the core around the aperture may be coated with an electrically conductive coating, for example a metal plating.

Additive manufacturing of passive radio frequency devices allows the production of complex shaped devices that would be difficult or even impossible to produce by machining. However, additive manufacturing has its own constraints and does not allow the manufacture of certain shapes or large parts.

The need to make effective connections between multiple parts is therefore recurrent.

US2012/0084968A1 describes a process for manufacturing passive waveguides in multiple parts made by 3D printing and then metallized before being assembled. The multi-part manufacturing process makes the process more flexible and allows for complex shaped parts that would be impossible to print in a single operation. However, this process creates discontinuities in the metal layer at the junction between the different metallized parts, which disrupt the signal transmission in the waveguide. On the other hand, the precise fit of the individual parts is difficult to ensure, and can hardly be improved by polishing or adjusting the metal layer, which is usually too thin.

The same problems of flange weight and bulk are also found in active RF equipment, e.g. semiconductor equipment such as low noise amplifiers, power amplifiers, filters, etc., where such equipment must be connected to waveguides.

BRIEF SUMMARY OF THE INVENTION

An aim of the present invention is to provide a passive or active radio frequency device free of or minimizing the limitations of known devices.

In particular, an aim of the invention is to provide a radio frequency device, for example a passive device, for example a waveguide, which is easily connectable to other elements, for example other waveguides, antennas, polarizers, etc.

A further aim of the invention is to provide an easily assembled radio frequency device of reduced mass, suitable for uses where mass reduction is a critical objective.

According to the invention, these aims are achieved in particular by means of a radio frequency device comprising at least: a tube through which a channel passes, a front face and/or a rear face forming a bearing surface through which the channel passes, said bearing surface forming an annular frame around one end of the tube and integral with the tube, said bearing surface comprising a plurality of axial fixing apertures passing through the bearing surface and opening outside said channel in order to allow the device to be fixed, the width of said frame being greater at the level of, and in the immediate vicinity of, the axial fixing apertures than at a distance from these axial fixing apertures.

The front and/or rear face thus forms a lightened flange.

The term "annular" and the term "annular frame" refer to any closed, non-full shape, including for example a rectangular, square, circular, oval, elliptical ring, etc. The shape of the outer circumference may be different from the shape of the aperture.

The bearing surface(s) allow the device to be aligned and pressed against another device attached by means of the axial fixing apertures.

At least one of the axial fixing apertures may be reinforced.

An axial aperture is, for example, said to be reinforced if the bearing surface uses more material in the vicinity of the axial fixing apertures than between the axial fixing apertures.

An axial aperture is for example said to be reinforced when the bearing surface forms an annular surface around the channel and the width of this annular surface is greater at the aperture than between two apertures. For example, the aperture is said to be reinforced when this axial aperture is provided in a lug or other prominent portion around the annular surface surrounding the channel.

An axial aperture is also said to be reinforced when the bearing surface forms an annular surface around the axial channel, which bearing surface comprises, except for a portion, for example a ring, around the axial aperture.

The reinforcement of the bearing surface at the axial fixing apertures allows for a comparatively lighter bearing surface between these fixing apertures, which ultimately results in a lighter bearing surface.

The bearing surface may be provided with an aperture corresponding to said channel, and an annular surface around said aperture.

The radial apertures pass through this bearing surface and open out at the rear of the bearing surface, but outside the channel.

The width of the bearing surface may be wider at and in close proximity to the axial fixing apertures than at a distance from the axial fixing apertures.

The bearing surface may be made thinner between the axial fixing apertures.

The bearing surface may be provided with recesses between the axial fixing apertures.

Advantageously, all or part of the bearing surfaces of the front or rear faces comprise a lattice structure. The use of such a structure, which is easy to produce by additive manufacturing, makes it possible to lighten the bearing surfaces, in particular between the lugs or the fixing apertures, in order to reduce the mass still further while maintaining sufficient rigidity of the bearing portions.

In one aspect, at least one of the bearing surfaces comprises a plurality of fixing lugs, each of the lugs comprising at least one said axial fixing aperture.

The reinforced lugs prevent deformation of the device when attached to another device by means of screws or pins engaged in the axial fixing apertures.

Each of the lugs may be independent and disjointed from the others, thus forming material-free inter-lug spaces, thereby lightening the structure of the device.

The device may have exactly three axial fixing apertures on one or more sides to allow isostatic fixing.

The device may have exactly three lugs per bearing surface, defining an attaching plane in an isostatic manner.

However, it is also possible to have two fixing points, four fixing points, or another number of fixing points.

The devices may be secured together by at least one screw or pin engaged in each axial fixing aperture. The screw or screws may be metallic or made of other materials.

The device may be a waveguide, more particularly a satellite antenna waveguide.

Advantageously, the bearing surface is flat. The fixation of two elements with flat faces allows for a simple, reliable and quickly installed fixation.

According to another advantageous embodiment, the bearing surface is in a plane perpendicular to the axis of the channel. In this way, devices with standard profiles, with aligned lugs, can be easily produced for easy and rigorous assembly.

Also advantageously, the bearing surface may be manufactured in one piece with the device. The one-piece construction simplifies the manufacturing process, and facilitates obtaining regular and precise dimensions.

According to a further advantageous embodiment, the device and its bearing surfaces are produced by additive manufacturing. This manufacturing method is particularly advantageous for producing customized or standard parts with a regular quality.

The channel may comprise a non-conductive core and a conductive shell around said core, said core and said conductive shell extending into said bearing surface.

The thickness of the metallic conductive layer is advantageously at least five times the skin depth $\delta$, preferably at least twenty times the skin depth $\delta$. This large thickness is not necessary for signal transmission, but contributes to the rigidity of the device, which is thus guaranteed by the metal shell despite a potentially less rigid multi-piece core than a monolithic core, and despite a reduced flange bearing surface.

The skin depth δ is defined as:

$$\delta = \sqrt{\frac{2}{\mu 2\pi f\sigma}}$$

where μ is the magnetic permeability of the plated metal, f is the radio frequency of the signal to be transmitted and σ is the electrical conductivity of the plated metal. Intuitively, this is the thickness of the zone where the current is concentrated in the conductor, at a given frequency.

In particular, this solution has the advantage, compared to the prior art, of providing waveguides assembled by additive manufacturing which are more resistant to the stresses to which they are exposed (thermal, mechanical, meteorological and environmental stresses).

The device core may be formed from a polymeric material.

The device core may be formed of a metal or alloy, for example aluminum, titanium or steel.

The device core may be formed of ceramic.

The device core may be formed by stereolithography, selective laser melting or selective laser sintering.

The metal layer forming the shell may optionally comprise a metal selected from Cu, Au, Ag, Ni, Al, stainless steel, brass or a combination thereof.

The strength of the device selected from tensile strength, torsional strength, bending strength or a combination thereof may be provided predominantly by the conductive layer.

According to an embodiment, the deposition of the conductive layer on the core is performed by electrolytic or galvanic deposition, chemical deposition, vacuum deposition, physical vapour deposition (PVD), printing deposition, sintering deposition.

In one embodiment of the process, the conductive layer comprises a plurality of successively deposited metal and/or non-metal layers.

The manufacture of the core comprises an additive manufacturing step. By "additive manufacturing" is meant any process for manufacturing parts by adding material, according to computer data stored on a computer medium and defining a model of the part. In addition to stereolithography and selective laser melting, the term also refers to other manufacturing methods such as liquid or powder curing or coagulation, including but not limited to binder jetting, DED (Direct Energy Deposition), EBFF (Electron beam freeform fabrication), FDM (fused deposition modeling), PFF (plastic freeforming), aerosol, BPM (ballistic particle manufacturing), powder bed, SLS (Selective Laser Sintering), ALM (Additive Layer Manufacturing), polyjet, EBM (electron beam melting), photopolymerization, etc. However, manufacturing by stereolithography or selective laser melting is preferred because it allows parts with relatively clean, low-roughness surfaces to be obtained.

The manufacturing of the core may comprise an additive manufacturing step by stereolithography, by selective laser melting or by selective laser sintering.

In the context of the invention, the terms "conductive layer", "conductive coating", "metallic conductive layer" and "metallic layer" are synonymous and interchangeable.

BRIEF DESCRIPTION OF THE FIGURES

Examples of the implementation of the invention are shown in the description illustrated by the attached figures in which.

EXAMPLE(S) OF EMBODIMENT OF THE INVENTION

Figure 1A:
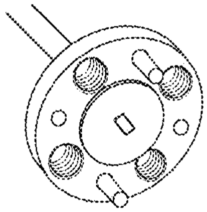
Fig. 1A (Prior art)
FIGS. 1*a*, 1*b* and 1*c* illustrate examples of waveguides of the prior art, comprising a flange surrounding the waveguide and allowing two waveguides with compatible flanges to be fixed together.
Figure 1B:
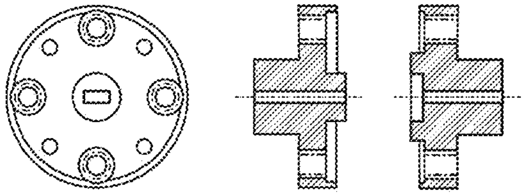
Fig. 1B (Prior art)
Figure 1C:
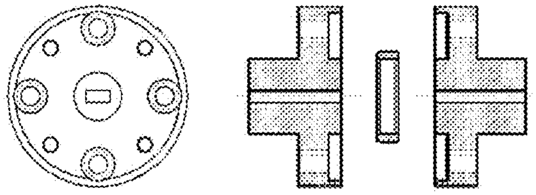
Fig. 1C (Prior art)

FIGS. 1*a* to 1*c* illustrate examples of flanges belonging to prior art radio frequency devices. These flanges are provided to facilitate the assembly together of several devices, for example several waveguide sections of identical or different shapes. Fixing is achieved by contacting the flanges provided at the ends of the waveguide sections. The flanges have apertures for the insertion of fixing elements such as screws or pins. The known flanges are large and their surface area is significantly larger than the surface area of a waveguide section. The large surface areas provided allow high quality assemblies to be made, with precise alignments, without the risk of impairing the performance of the assembled elements. However, the large surface areas used make the parts considerably heavier, making them unsuitable for certain applications where mass is a critical factor.

Figure 2:
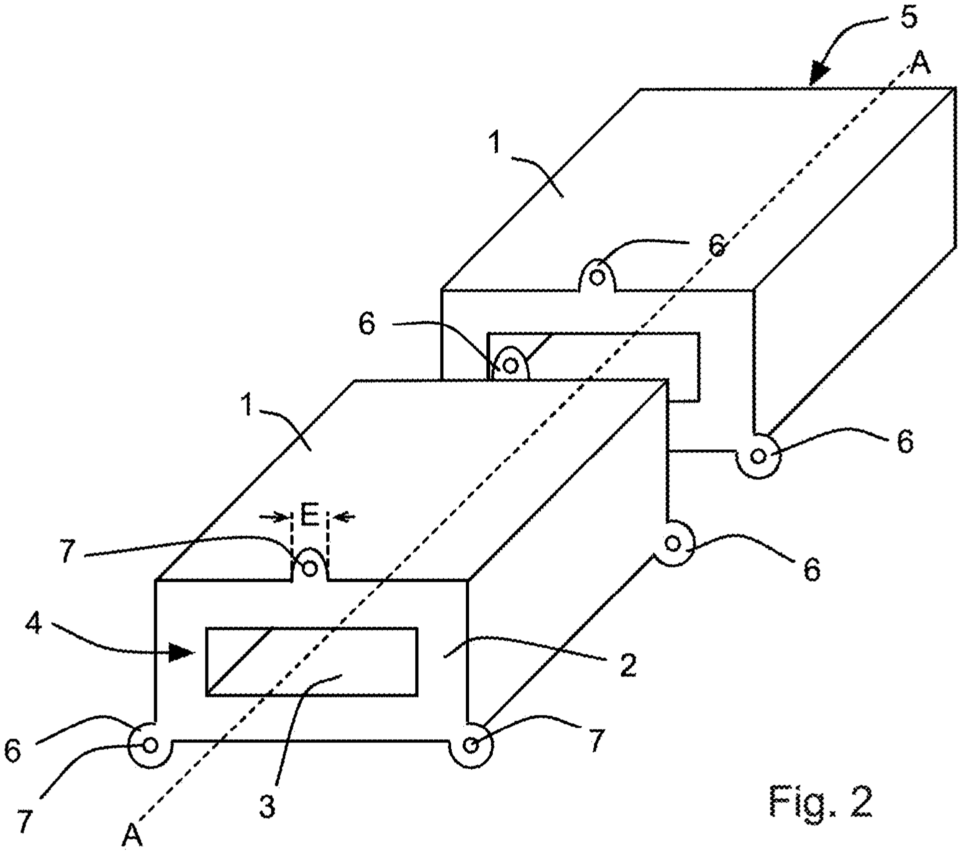
FIG. 2 is a perspective view of two parts intended to be joined in a plane perpendicular to the direction of signal propagation to form a longer waveguide.

An example of a device according to the invention is illustrated in FIG. 2. As illustrated, the radio frequency device 1, here a passive radio frequency device, for example a waveguide, comprises a tube 2 of elongated shape along a longitudinal axis A-A. A channel 3, for the transmission of the radio frequency signal, is also aligned along the axis A-A, and passes through the tube. In the example shown, the longitudinal opening 3 is rectangular in cross-section and defines a channel for the transmission of the radio frequency signal. Other channel shapes, including round, square, elliptical, semi-circular, semi-elliptical, hexagonal, octagonal, etc., can be used.

The cross-section of the opening is determined according to the frequency of the electromagnetic signal to be transmitted. The dimensions of this internal channel and its shape are determined according to the operational frequency of the device 1, i.e. the frequency of the electromagnetic signal for which the device is manufactured and for which a stable transmission mode and optionally with minimum attenuation is obtained. The tube 2 may be made of metal, or by metallization of a core 2 of for example polymer, epoxy, ceramic, organic material or metal.

A front face 4 and/or a rear face 5 define bearing surfaces for connecting two or more devices 1 together along the axis A-A. The bearing surfaces of the front 4 and rear 5 are in a plane perpendicular to the channel axis.

In order to fix two consecutive adjacent devices together, the front and/or rear faces of the device form an annular surface around the channel 3, this annular surface comprising a plurality of fixing lugs 6. The width of the annular surface is therefore greater at the lugs around the fixing points than between the lugs, thereby strengthening the fixing points. The contact face of each lug is coplanar with the adjacent face 4 or 5 of the channel. Arrangements can be designed to maintain compatibility with existing flanges, whether standardized or not.

In the illustrated examples, exactly three fixing points are provided, thus enabling isostatic fixing. These three fixing points are provided in three lugs 6 distributed around the opening and thus creating an isostatic fixing plane. The lugs 6 are here distributed with two lugs in the lower corners and one in the middle area of the opposite edge. Other arrangements with lugs 6 in the corners and/or along the edges are possible.

The lugs have axial apertures 7, which are used to insert fastening elements such as screws, screw/nut assemblies, pins, etc. Other apertures may be provided in the lugs or bearing surfaces to reduce mass. Heat dissipation surfaces may also be provided.

In order to best meet the desired objectives of reducing mass in relation to the use of flanges, the dimensions of the lugs 6 are greatly reduced in relation to those of the device 1. For example, the lugs 6 are dimensioned so that the total sum of the footprints E is less than one third and more preferably less than one quarter of the external perimeter of the core 2 of the device 1. By footprint is meant the width of the lug at the level of the intersection with the core 2 of the device, as illustrated for example in FIGS. 2 and 4.

Figure 3:
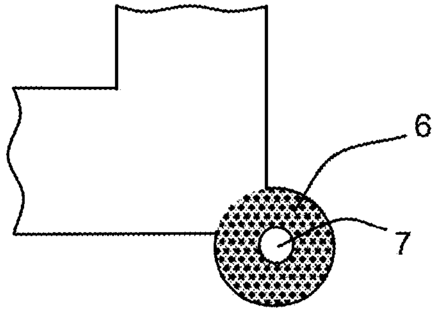
FIG. 3 shows an enlarged view of a lug of a variant of the device in which the fixing lugs are made with a lattice structure.

FIG. 3 illustrates an alternative embodiment in which at least one of the lugs 6, and possibly the remainder of the annular surface around the channel, is made of a lattice structure, i.e. comprising beams separated by recesses. Such an architecture further contributes to the objectives of mass reduction, without affecting the rigidity and/or durability of the fixture.

Figure 4:
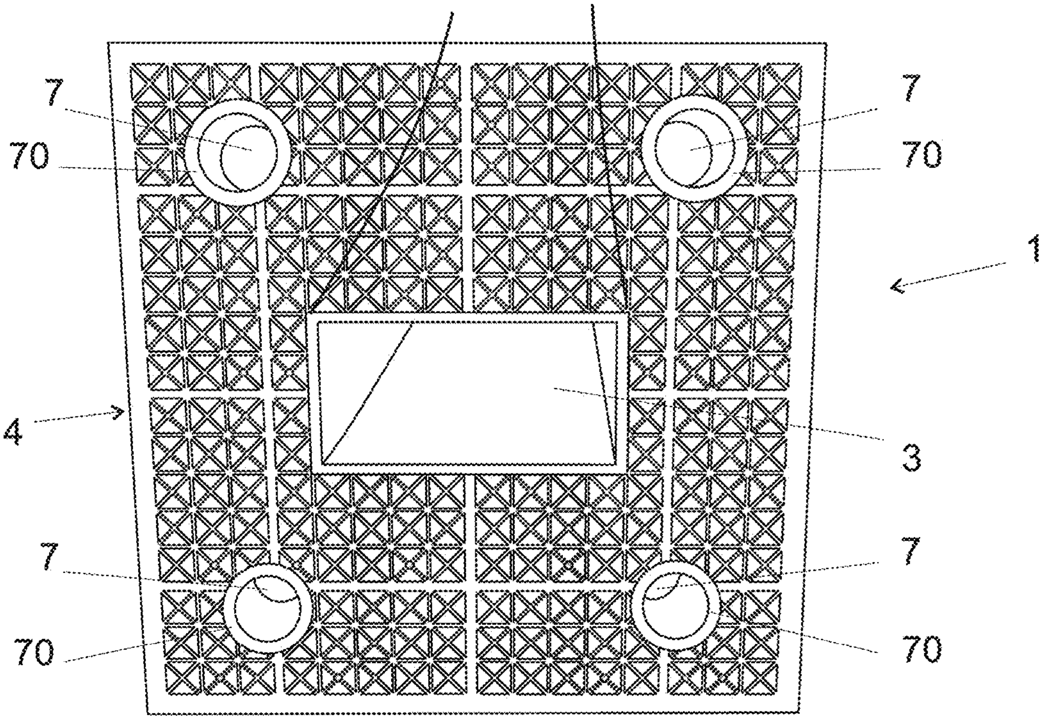
FIG. 4 illustrates a front view of a front or rear face of a waveguide device forming a bearing surface (flange) provided with an opening corresponding to said channel, said bearing surface being made of a lattice structure and comprising four reinforced axial apertures.

FIG. 4 illustrates a front view of an all-mesh bearing surface (flange) 4 between the four axial fixing apertures 7. The apertures are reinforced with a reinforcing ring 70 which is denser than the rest of the mesh around each aperture. This design allows the size of the bearing surface 4 to be increased, without significantly increasing its mass, and thus ensures a strictly flat bearing surface even after clamping against the corresponding bearing surface of an adjacent device. The density of the mesh may vary around the periphery of the bearing surface, and may be greater, for example, in the vicinity of the fixing apertures 7 than at a distance from them.

The tube and its bearing surfaces 6 are preferably produced by additive manufacturing, as described later. This method of manufacturing makes it possible to produce in a simple manner a device provided with bearing surfaces (flanges) of complex shape, for example a tube provided with lugs, and/or a lattice structure.

FIG. 2 illustrates two aligned devices 1, intended to be fixed together.

The two devices are intended in this example to be juxtaposed one after the other in the direction of signal transmission, thus forming a continuous elongated longitudinal channel. The bearing surfaces intended to be brought into contact are flat and perpendicular to the direction of transmission of the radio frequency signal.

The front or rear face of the device may have a central area that is very slightly recessed so that it does not touch the face of the flange of the device or of the connected equipment, but is separated from it by a narrow gap. The recessed area is bounded by a deeper groove in the flange surface. This arrangement allows for short-circuit operation. This central recessed area can also be provided in the case of a lattice flange as described above.

Figure 5:
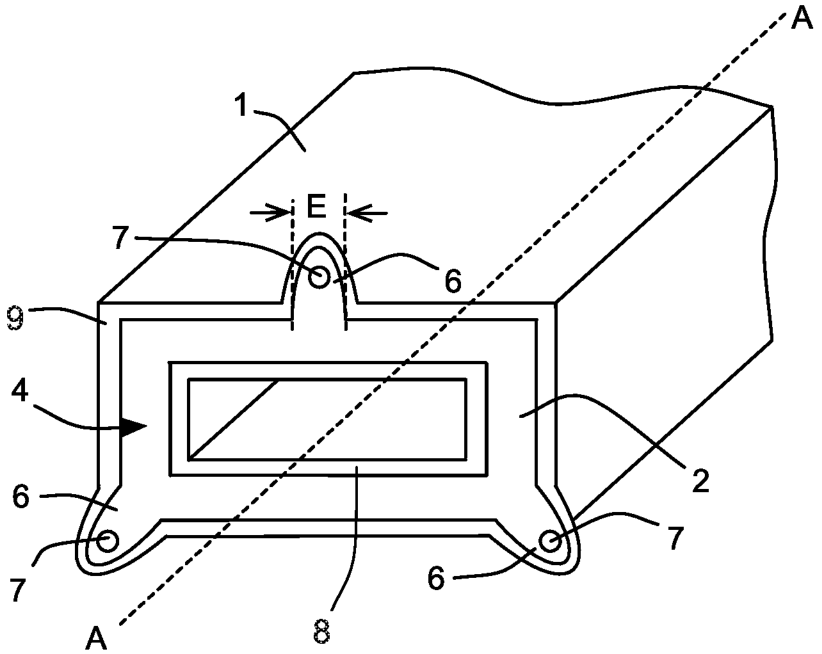
FIG. 5 shows a cross-sectional view of a device having a core covered with a conductive jacket on the inner and outer walls.

In the embodiment illustrated in FIG. 5, the inner and outer surface of the core 2 are covered with a conductive metal layer, for example copper, silver, gold, nickel etc, plated by chemical deposition without electrical current. The thickness of this layer is for example between 1 and 20 micrometers, for example between 4 and 10 micrometers. FIG. 5 illustrates the device in which a layer formed by metal deposition forms a conductive coating 8 on the inner surface 9 and on the outer surface of the core 2. The coating may also be a combination of layers, comprising for example a smoothing layer directly on the core, one or more bonding layers, etc.

In this example, the bearing surfaces (e.g. the lugs 6) also comprise a core covered by the outer conductive layer 8.

The thickness of this conductive coating 8 or 9 must be sufficient for the surface to be electrically conductive at the chosen radio frequency. This is typically achieved by using a conductive layer with a thickness greater than the skin depth 6.

This thickness is preferably substantially constant on all internal surfaces in order to achieve a finished part with accurate dimensional tolerances for the channel.

In one embodiment, the thickness of this layer 8 or 9 is at least five times and preferably at least twenty times greater than the skin depth, in order to improve the structural, mechanical, thermal and chemical properties of the device. The surface currents are thus mainly, if not almost exclusively, concentrated in this layer.

The application of a metallic coating on the external surfaces does not contribute to the propagation of the radio frequency signal in the channel 3, but does have the advantage of protecting the device from thermal, mechanical or chemical attack. In a non-illustrated embodiment, only the inner surface of the core, around channel 3, is covered with a metal jacket. The outer surfaces are bare, or covered with a different coating.

Additive Manufacturing

The device 1 is advantageously manufactured by additive manufacturing, preferably by stereolithography, selective laser melting, selective laser sintering (SLS) in order to reduce surface roughness. The core material may be non-conductive or conductive. The wall thickness is for example between 0.5 and 3 mm, preferably between 0.8 and 1.5 mm.

The shape of the device may be determined by a computer file stored in a computer data medium and used to control an additive manufacturing device.

The deposition of conductive metal on the inner and possibly outer faces is achieved by immersing the core 2 in a series of successive baths, typically 1 to 15 baths. Each bath involves a fluid with one or more reagents. The deposition does not require the application of a current to the core to be coated.

Reference Numbers Used on Figures

- 1 Passive radio frequency device
- 2 Core
- 3 Channel
- 4 Front side
- 5 Rear side
- 6 Lugs
- 7 Axial fixing aperture
- 70 Reinforcement ring
- 8 Inner conductive coating
- 9 External conductive coating

What is claimed is:

1. Radio frequency device comprising at least:

a tube through which a channel passes, a front face and/or a rear face forming a bearing surface through which the channel passes, said bearing surface forming an annular frame around one end of the tube and being integral with the tube, said bearing surface comprising a plurality of axial fixing apertures passing through the bearing surface and opening outside said channel in order to allow fixation of the device, the width of said frame being greater at and in the immediate vicinity of the axial fixing apertures than at a distance from these axial fixing apertures wherein said bearing surface forming a lattice structure, said lattice structure being reinforced around each axial aperture.

2. Radio frequency device of claim 1, said lattice structure being reinforced around each axial aperture by a reinforcing ring.

3. Radio frequency device of claim 1, the bearing surface being planar.

4. Radio frequency device of claim 1, said front face or rear face comprising a recessed central portion delimited by a deep annular groove.

5. Radio frequency device of claim 1, wherein the front and/or rear faces are in a plane perpendicular to the channel axis.

6. Radio frequency device of claim 1, the device being a waveguide.

7. Radio frequency device of claim 1, the channel comprising a non-conductive core and a conductive jacket around this core, said core and said conductive jacket extending into said bearing surface.

8. Radio frequency device of claim 7, wherein the core is made by additive manufacturing.

* * * * *